(12) United States Patent
Davidson et al.

(10) Patent No.: US 12,016,491 B2
(45) Date of Patent: Jun. 25, 2024

(54) SPICE GRINDER

(71) Applicant: Nypro Inc., Clinton, MA (US)

(72) Inventors: Ryan P. Davidson, St. Petersburg, FL (US); Randall K. Julian, St. Petersburg, FL (US); Jeffrey C. Minnette, St. Petersburg, FL (US); Morgan Le Roux, Avignon (FR); Olivier Rattin, Althen-des-Paluds (FR); Mark Armstrong, Llan Ffestiniog (GB)

(73) Assignee: NYPRO, INC., Clinton, MA (US)

( * ) Notice: Subject to any disclaimer, the term of this patent is extended or adjusted under 35 U.S.C. 154(b) by 38 days.

(21) Appl. No.: 17/436,316

(22) PCT Filed: Feb. 28, 2020

(86) PCT No.: PCT/US2020/020342
§ 371 (c)(1),
(2) Date: Sep. 3, 2021

(87) PCT Pub. No.: WO2020/180665
PCT Pub. Date: Sep. 10, 2020

(65) Prior Publication Data
US 2022/0175189 A1    Jun. 9, 2022

Related U.S. Application Data

(60) Provisional application No. 62/813,583, filed on Mar. 4, 2019.

(51) Int. Cl.
*A47J 42/04*    (2006.01)
*A47J 42/08*    (2006.01)
(Continued)

(52) U.S. Cl.
CPC ............. *A47J 42/04* (2013.01); *A47J 42/38* (2013.01)

(58) Field of Classification Search
CPC ............. A47J 42/04; A47J 42/38; A47J 42/50
See application file for complete search history.

(56) References Cited

U.S. PATENT DOCUMENTS

| 3,371,874 A | 3/1968 | Reeves et al. |
| 4,135,672 A * | 1/1979 | Schlessel ............... A47J 42/04 |
| | | 241/257.1 |

(Continued)

FOREIGN PATENT DOCUMENTS

| EP | 0986984 A1 | 9/1999 |
| WO | 2007093974 A1 | 8/2007 |
| WO | 2010116334 A1 | 10/2010 |

OTHER PUBLICATIONS

International Search Report; International Application No. PCT/US2020/020342; International Filing Date: Feb. 28, 2020; dated Jul. 1, 2020; 5 pages.

(Continued)

*Primary Examiner* — Matthew Katcoff
*Assistant Examiner* — Mohammed S. Alawadi
(74) *Attorney, Agent, or Firm* — CANTOR COLBURN LLP

(57) ABSTRACT

A grinder assembly removably connectable to a container of a spice dispenser includes a stationary grinder component and a rotatable grinder component associated with said stationary grinder component to define a grinding chamber between a portion of said stationary grinder component and a portion of said rotatable grinder component. The rotatable grinder component is rotatable relative to said stationary grinder component about a grinding axis. The grinder assembly additionally includes a first feature for coupling the grinder assembly to said container and a second feature movable to selectively decouple the grinder assembly from the container.

16 Claims, 15 Drawing Sheets

(51) Int. Cl.
*A47J 42/38* (2006.01)
*A47J 42/50* (2006.01)

(56) References Cited

U.S. PATENT DOCUMENTS

| | | | |
|---|---|---|---|
| 6,247,661 B1 | 6/2001 | Chainani | |
| 6,663,031 B2 | 12/2003 | Henderson et al. | |
| 6,929,201 B1 | 8/2005 | Blouse et al. | |
| 7,284,719 B2 | 10/2007 | Delbridge et al. | |
| 7,377,477 B2 | 5/2008 | Lucek et al. | |
| 7,806,354 B2 | 10/2010 | De Groote et al. | |
| 2002/0092941 A1* | 7/2002 | Henderson | A47J 42/50 241/169.1 |
| 2005/0184177 A1 | 8/2005 | Blouse et al. | |
| 2009/0120559 A1 | 5/2009 | Moosheimer et al. | |
| 2010/0308141 A1 | 12/2010 | Bich | |
| 2012/0006922 A1* | 1/2012 | Wilson | A47J 42/08 241/293 |
| 2022/0092941 A1 | 3/2022 | Huke et al. | |

OTHER PUBLICATIONS

Written Opinion of the International Searching Authority; International Application No. PCT/US2020/020342; International Filing Date: Feb. 28, 2020; dated Jul. 1, 2020; 6 pages.
European Extended Search Report; European Application No. 20766042.4; dated Oct. 11, 2022; 7 pages.
International Preliminary Report on Patentability: PCT Application No. PCT/US2020/020342; International Filing Date: Feb. 28, 2020; dated Sep. 16, 2021; 8 Pages.
Chinese Office Action for Chinese Application No. 202080019092.1; dated May 19, 2023 (18 Pages with English Translation).
Chinese Office Action for Chinese Application No. 202080019092.1; dated Oct. 19, 2023 (6 Pages with English Translation).

* cited by examiner

SPICE GRINDER

CROSS REFERENCE TO RELATED APPLICATIONS

This application is a National Stage application of PCT/US2020/020342, filed Feb. 28, 2020, which claims the benefit of U.S. Provisional Application No. 62/813,583, filed Mar. 4, 2019, both of which are incorporated by reference in their entirety herein.

BACKGROUND

Field of the Disclosure

Exemplary embodiments disclosed herein relate generally to a spice dispenser and more particularly, to a spice dispenser having a removable grinding assembly such that the spice dispenser is refillable.

Description of the Background

Spice grinders typically include a grinding assembly that attaches onto a spice container, such as a bottle for example. Because the grinding assembly is rotated to grind the products within the bottle, the grinding assembly is commonly affixed to the bottle via a permanent, snap-fit connection. However, it may be desirable to refill the container once emptied. Accordingly, there is a need for a spice dispenser that allows a user to easily remove and reattach a grinding assembly for repeatable use of the spice dispenser.

SUMMARY

According to an embodiment, a grinder assembly removably connectable to a container of a spice dispenser includes a stationary grinder component and a rotatable grinder component associated with said stationary grinder component to define a grinding chamber between a portion of said stationary grinder component and a portion of said rotatable grinder component. The rotatable grinder component is rotatable relative to said stationary grinder component about a grinding axis. The grinder assembly additionally includes a first feature for coupling the grinder assembly to said container and a second feature movable to selectively decouple the grinder assembly from the container.

According to another embodiment, a reusable spice dispenser includes a container having a hollow cavity and a grinder assembly removably connectable to said container to seal the cavity The grinder assembly includes a stationary grinder component in communication with said hollow cavity, a rotatable grinder component rotatable relative to said stationary grinder component about a grinding axis, a first feature for coupling the grinder assembly to said container, and a second feature movable to selectively decouple the grinder assembly from the container.

According to yet another embodiment, a grinder assembly removably connectable to a container of a spice dispenser includes a stationary grinder component and a rotatable grinder component coupled to said stationary grinder component to define a grinding chamber between a portion of said stationary grinder component and a portion of said rotatable grinder component. The rotatable grinder component is rotatable relative to said stationary grinder component about a grinding axis. A feature extending from said stationary grinder component is movable between a first position and a second position. In the first position, said feature is operable to restrict movement of said stationary grinder component relative to the container, and in the second position said stationary grinder component is separable from the container.

According to yet another embodiment, a reusable spice dispenser includes a container having a hollow cavity and a grinder assembly removably connectable to said container. The grinder assembly includes a stationary grinder component in communication with said hollow cavity, a rotatable grinder component rotatable relative to said stationary grinder component about a grinding axis and a feature extending from said stationary grinder component that is movable between a first position and a second position to selectively couple said stationary grinder component to said container.

According to an embodiment, a grinder assembly removably connectable to a container of a spice dispenser includes a stationary grinder component and a rotatable grinder component associated with said stationary grinder component to define a grinding chamber between a portion of said stationary grinder component and a portion of said rotatable grinder component. The rotatable grinder component is rotatable relative to said stationary grinder component about a grinding axis. The rotatable grinder component includes a feature and when said feature is aligned with an opening of said stationary grinder component, said rotatable grinder component is translatable along said grinding axis between a plurality of positions relative to said stationary grinder component to adjust a size of said grinding chamber.

According to an embodiment, a spice dispenser includes a container having a hollow cavity and a grinder assembly including at least one movable component. The grinder assembly is rotatable relative to said container. A tamper label having a perforation formed therein is mounted to the spice dispenser such that a portion of the tamper label overlaps with said at least one movable component, and said perforation is aligned with a plane of movement associated with said at least one movable component.

DETAILED DESCRIPTION

Figure 1:
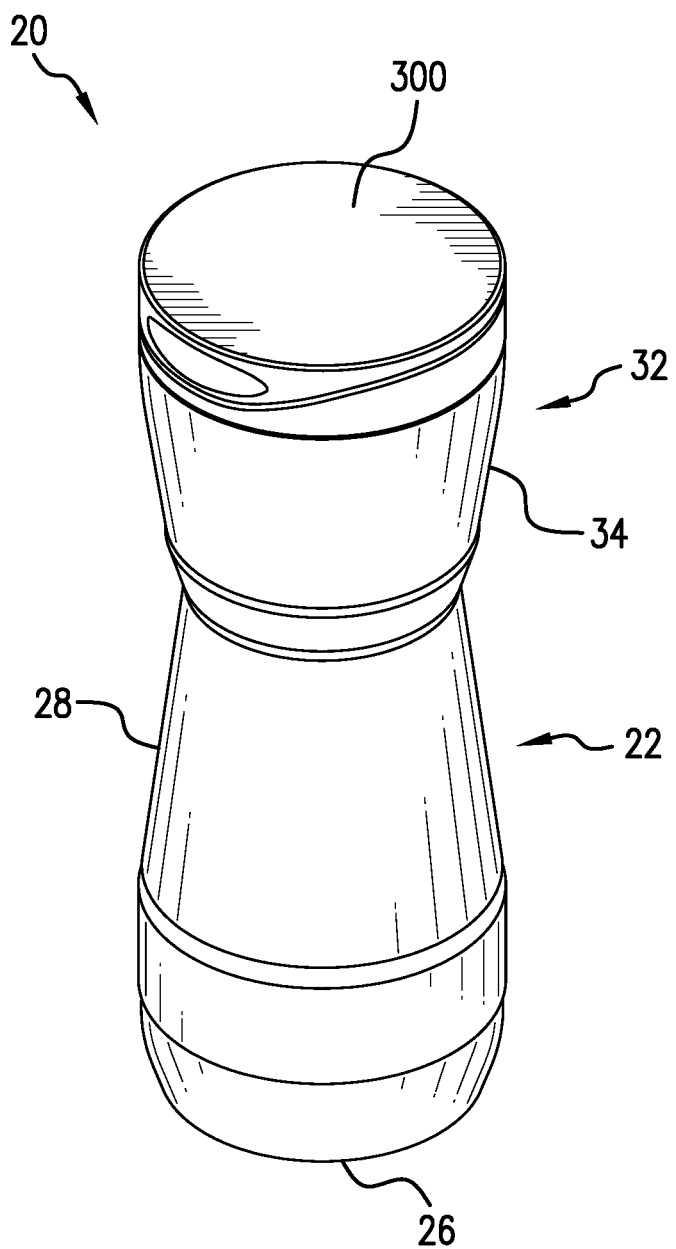
FIG. 1 is a perspective view of an example of a spice dispenser according to an embodiment.
Figure 2:
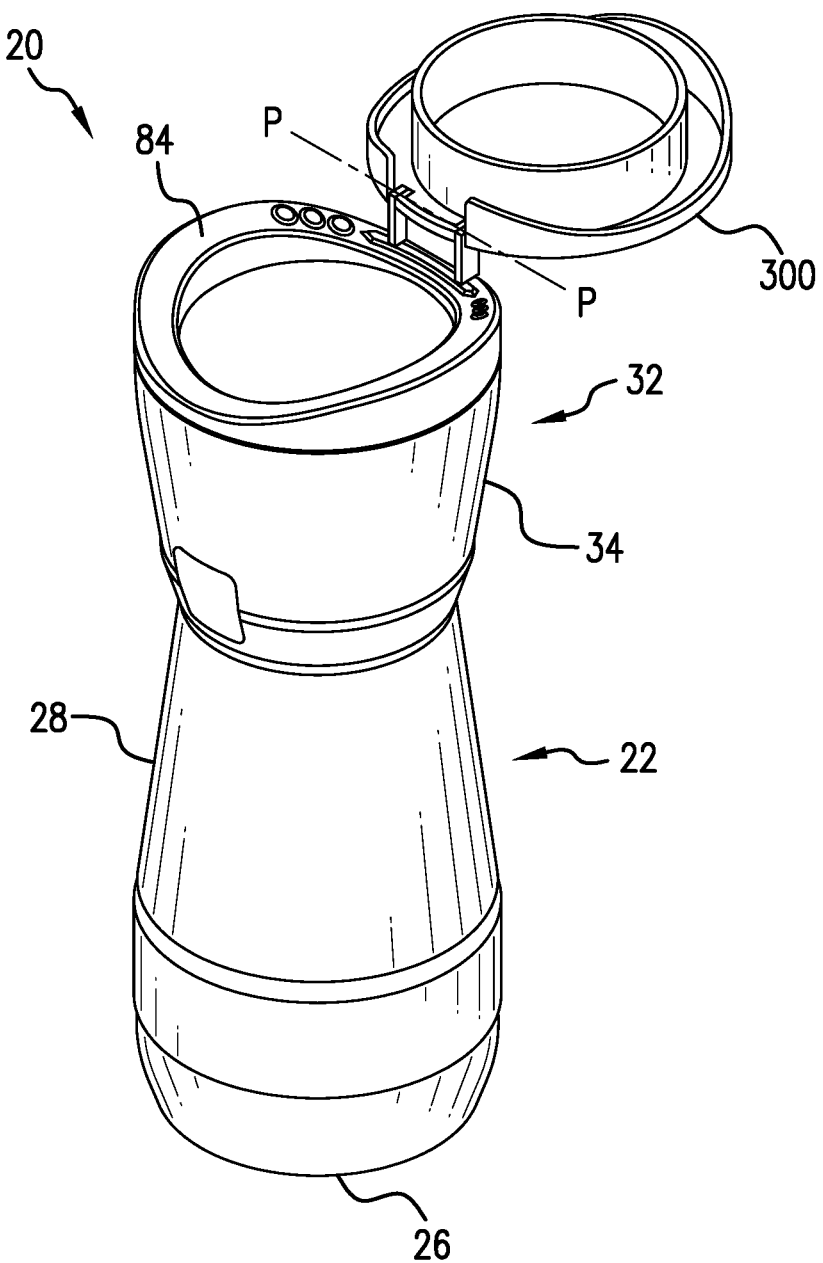
FIG. 2 is a perspective view of the spice dispenser of FIG. 1 with the lid in an open position according to an embodiment.
Figure 3:
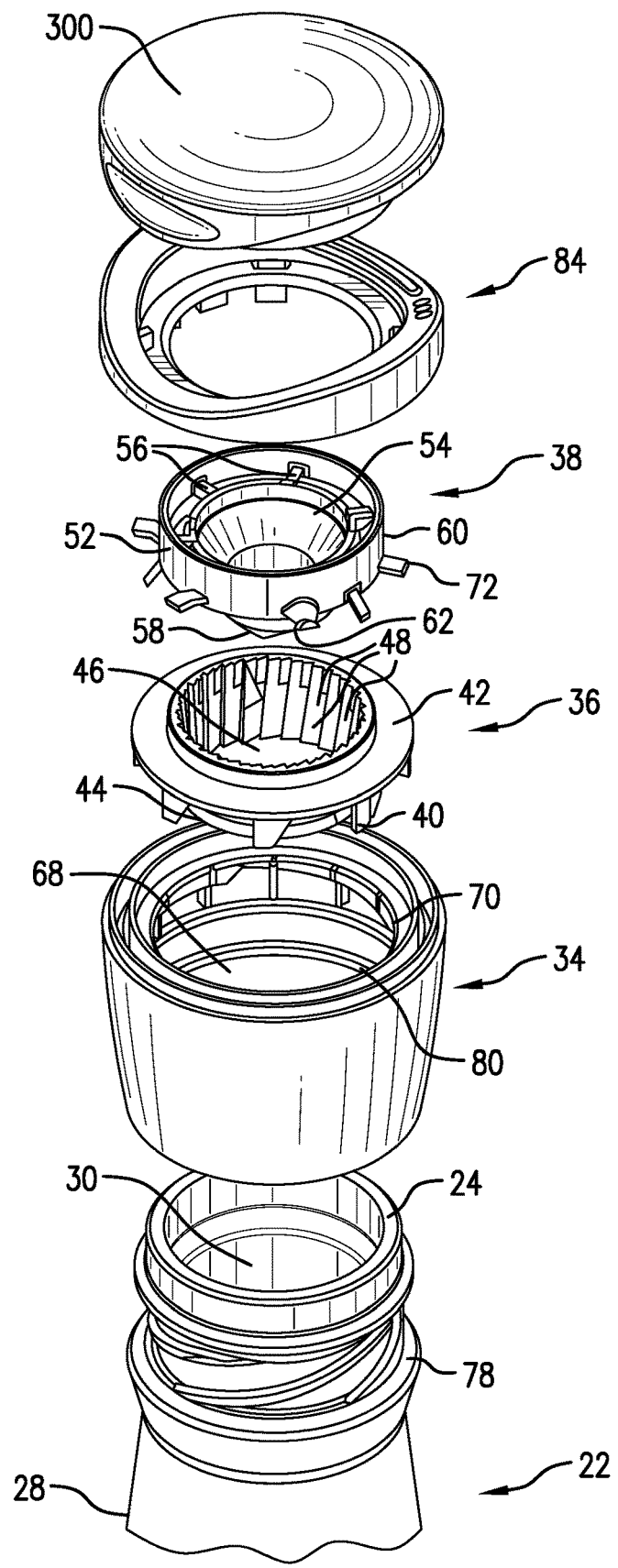
FIG. 3 is an exploded perspective view of the grinder assembly of the spice dispenser of FIG. 1 according to an embodiment.

A detailed description of one or more embodiments of the disclosed apparatus and method are presented herein by way of exemplification and not limitation with reference to the Figures.

With reference now to FIGS. 1-5 an example of a spice dispenser 20 is illustrated. As shown, the spice dispenser 20 includes a container 22 having a first end 24, a second end 26, and at least one wall 28 extending between the first end 24 and the second end 26. Together, the first end 24 and the at least one wall 28 cooperate to define a cavity 30 within which a food item, such as spices for example, are received. Generally, the second end 26 of the container 22 is closed or sealed and the first end 24 of the container 22 is open such that food is inserted into the cavity 30 of the container 22 via the first end 24. The container 22 illustrated and described herein is intended as an example only, and a container having any suitable configuration is within the scope of the disclosure.

The spice dispenser 20 additionally includes a grinder assembly 32 mounted to the container 22 to seal the first open end 24 thereof. In the illustrated, non-limiting embodiment of FIGS. 1-5, the grinder assembly 32 includes an outer housing 34, a stationary grinder component 36, and a rotatable grinder component 38. In an embodiment, any of the components of the grinder assembly may be formed from a suitable plastic material, such as polyethylene terephthalate for example. However, it should be understood that not only other plastics, but also other materials such as metals or composites for example, may be used to form any of the components of the spice dispenser 20.

The stationary grinder component 36 includes a grinding sleeve 40 having a circumferential web 42 protruding outwardly from the exterior 44 of the grinding sleeve 40. As shown, an outer diameter of the grinding sleeve 40 may be generally equal to or slightly smaller than the inner diameter of the container 22 at the first open end 24. Accordingly, when the grinder assembly 32 is attached to the container 22, at least a portion of the grinding sleeve 40 extends into the cavity 30 of the container 22. However, it should be understood that embodiments where the grinding sleeve 40 is outside of but in communication with the cavity are also within the scope of the disclosure. In an embodiment, the web or flange 42 of the stationary grinder component 36 is arranged in direct contact with and supported by the exposed end 24 of the container 22 to properly position the stationary grinder component 36 relative to and in communication with the cavity 30 of the container 22.

As shown, the grinding sleeve 40 includes a bore 46 and a plurality of teeth 48 protruding inwardly from the inner surface 50 of the grinding sleeve 40. In an embodiment, each tooth 48 is in the form of a rib which extends generally over the height of the grinding sleeve 40. Although the bore 46 is illustrated as being generally tapered or conical in shape, it should be understood that any suitable configuration of the stationary grinder component 36, and more specifically of the bore 46 and teeth 48 for example, are within the scope of the disclosure.

The rotatable grinder component 38 is configured to cooperate with the stationary grinder component 36 to break or grind the food arranged within the cavity 30 of the container 22. In the illustrated, non-limiting embodiment, the rotatable grinder component 38 includes a support ring 52 and a grinding element 54 connected to the support ring 52 by one or more radially extending spokes 56. As shown, an inner diameter of the support ring 52 is larger than an outer diameter of the grinding sleeve 40. Accordingly, the support ring 52 is rotatable about the grinding sleeve 40 without interference.

In an embodiment, the rotatable grinding element 54 is generally conical is shape and is closed at its lower end 58 and open at its upper end 60. When the grinder assembly 32 is affixed to the container 22, the rotatable grinder component 38 is axially aligned with and upwardly adjacent the stationary grinder component 36 such that at least a portion of the grinding element 54 is received within the bore 46 of the stationary grinder component 36. In an embodiment, one or more grinding teeth 62 are located at the exterior surface 64 of the grinding element 54.

A grinding chamber 66 is defined between the exterior 64 of the grinding element 54 and the plurality of teeth 48 of the grinder sleeve 40 of the stationary grinder component 36. This grinding chamber 66 is in communication with the openings defined between the plurality of spokes 56 coupling the grinding element 54 and the support ring 52 to define a path of the broken or ground food out of the grinding chamber 66.

Figure 4:
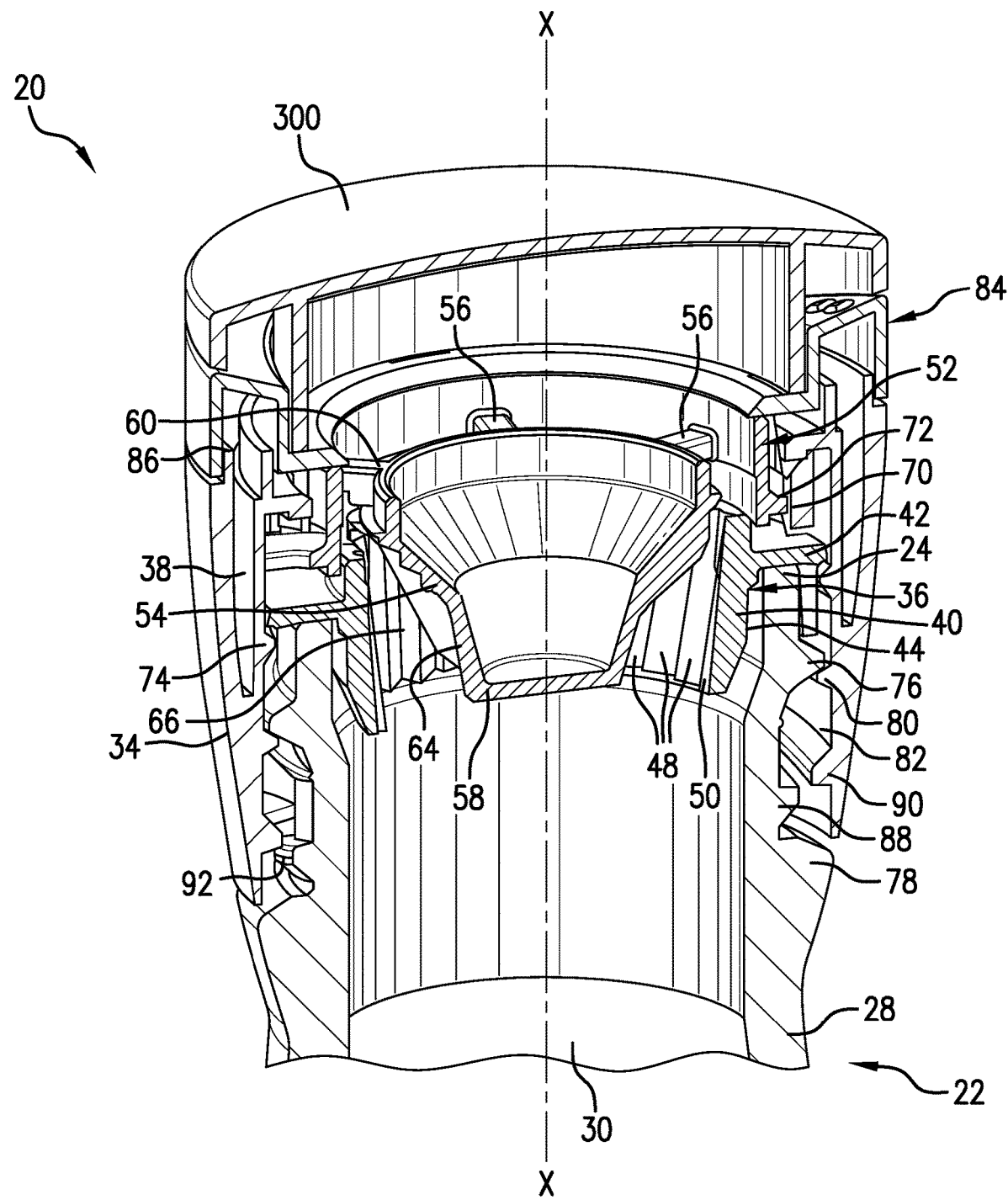
FIG. 4 is a perspective cross-sectional view of a portion of the spice dispenser of FIG. 1 according to an embodiment.
Figure 5:
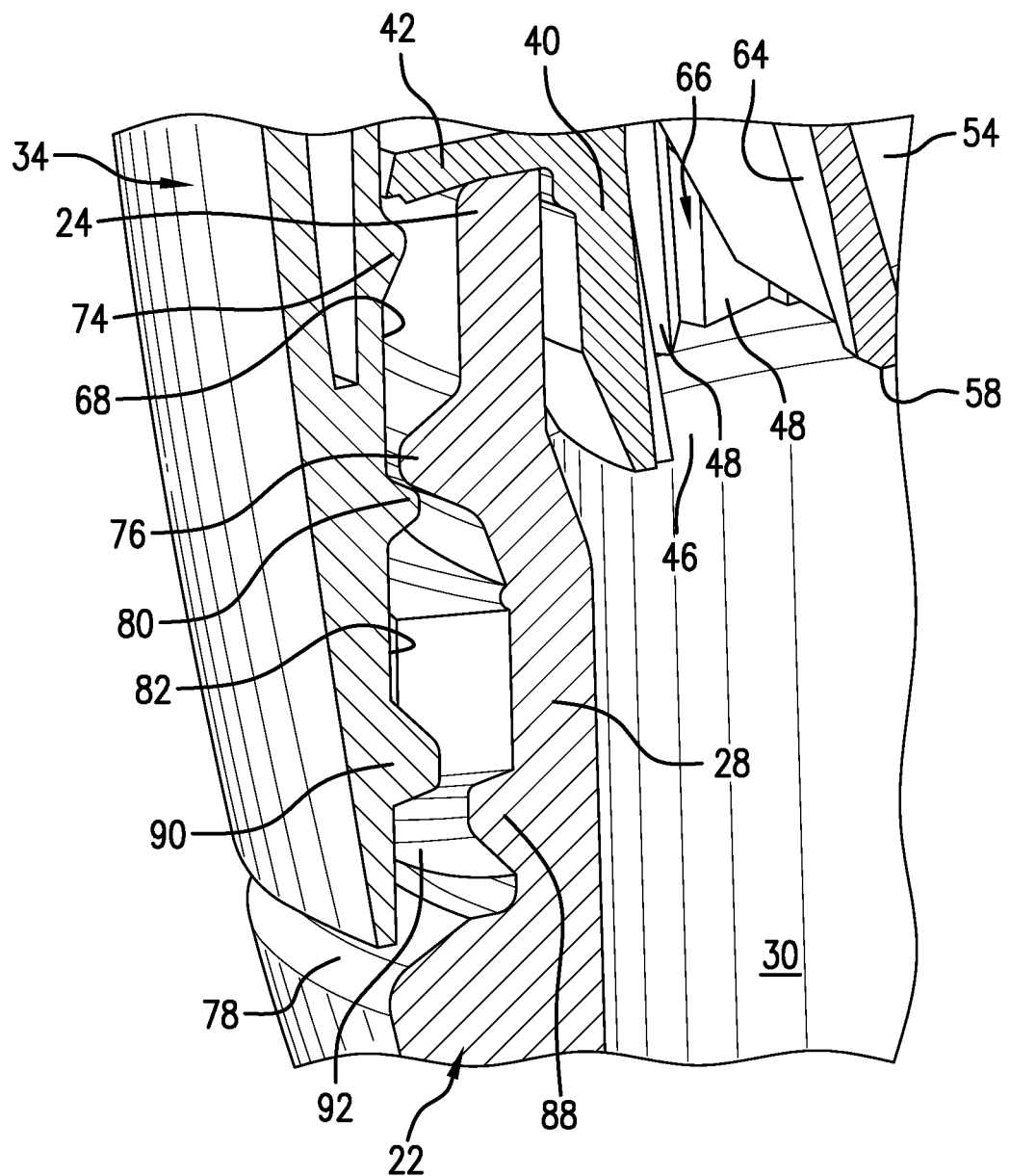
FIG. 5 is a detailed view of the interface between an outer housing of the grinder assembly and the container according to an embodiment.
Figure 6:
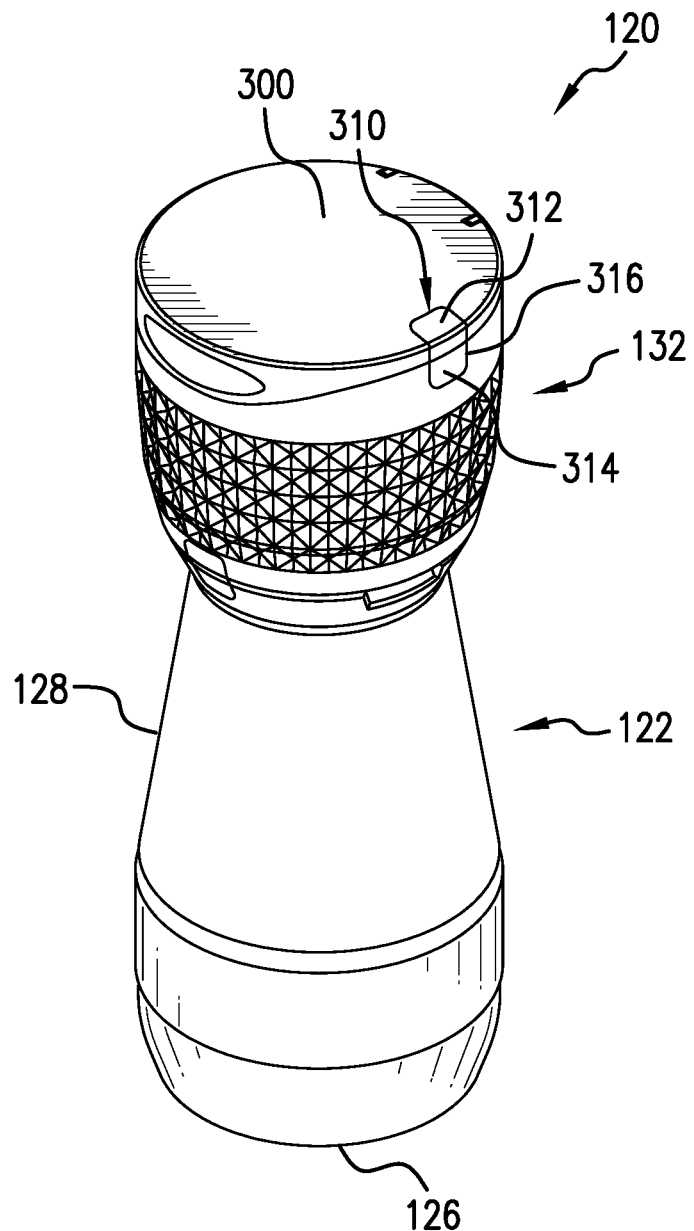
FIG. 6 is a perspective view of an example of a spice dispenser according to an embodiment.
Figure 7:
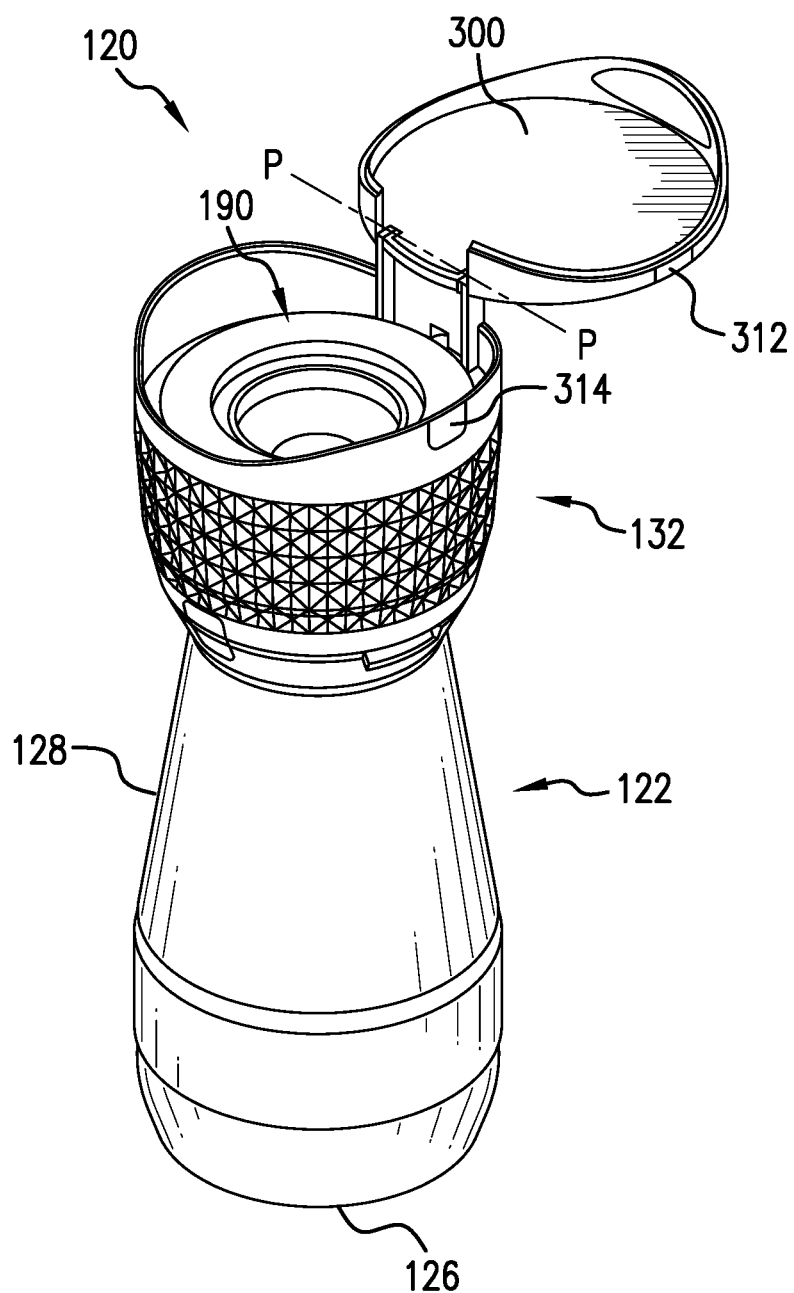
FIG. 7 is a perspective view of the spice dispenser of FIG. 6 with the lid in an open position according to an embodiment.
Figure 8:
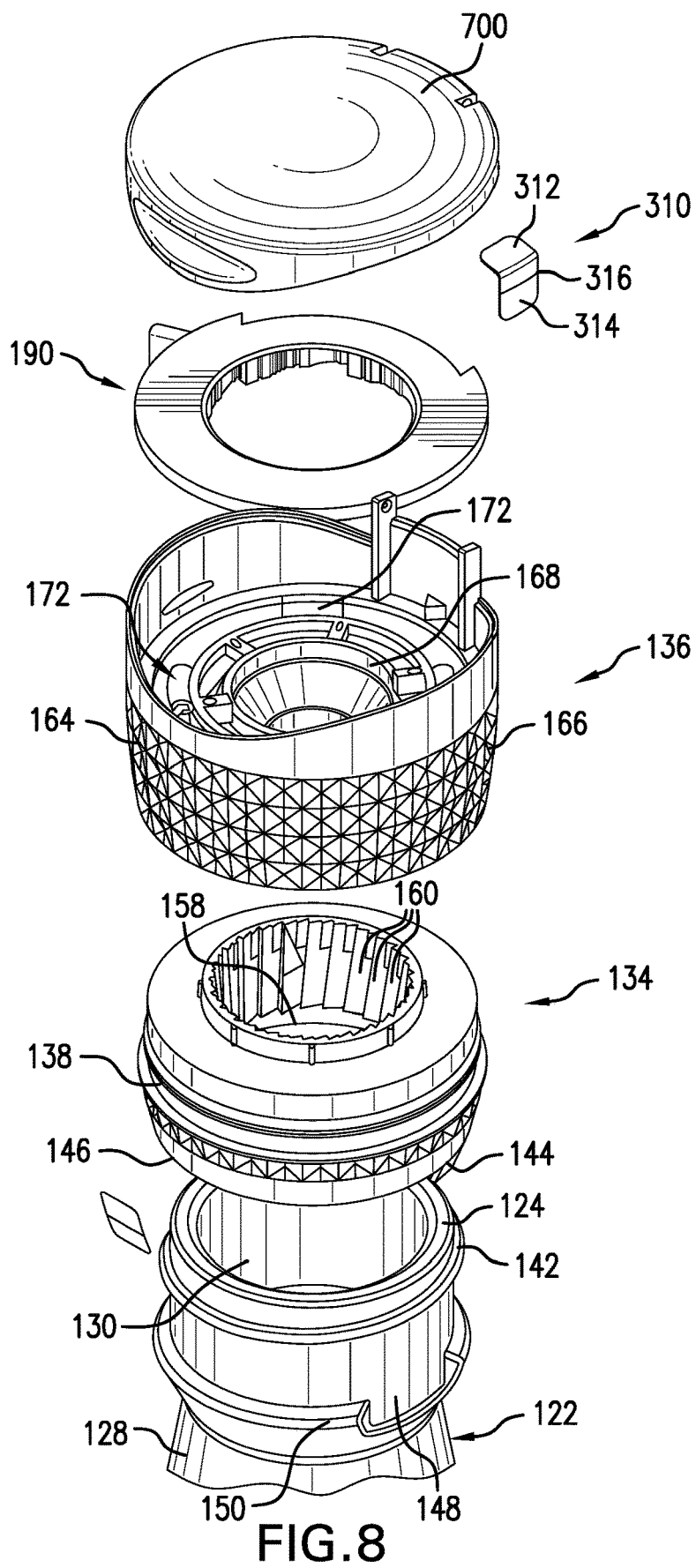
FIG. 8 is an exploded perspective view of the grinder assembly of the spice dispenser of FIG. 6 according to an embodiment.
Figure 9:
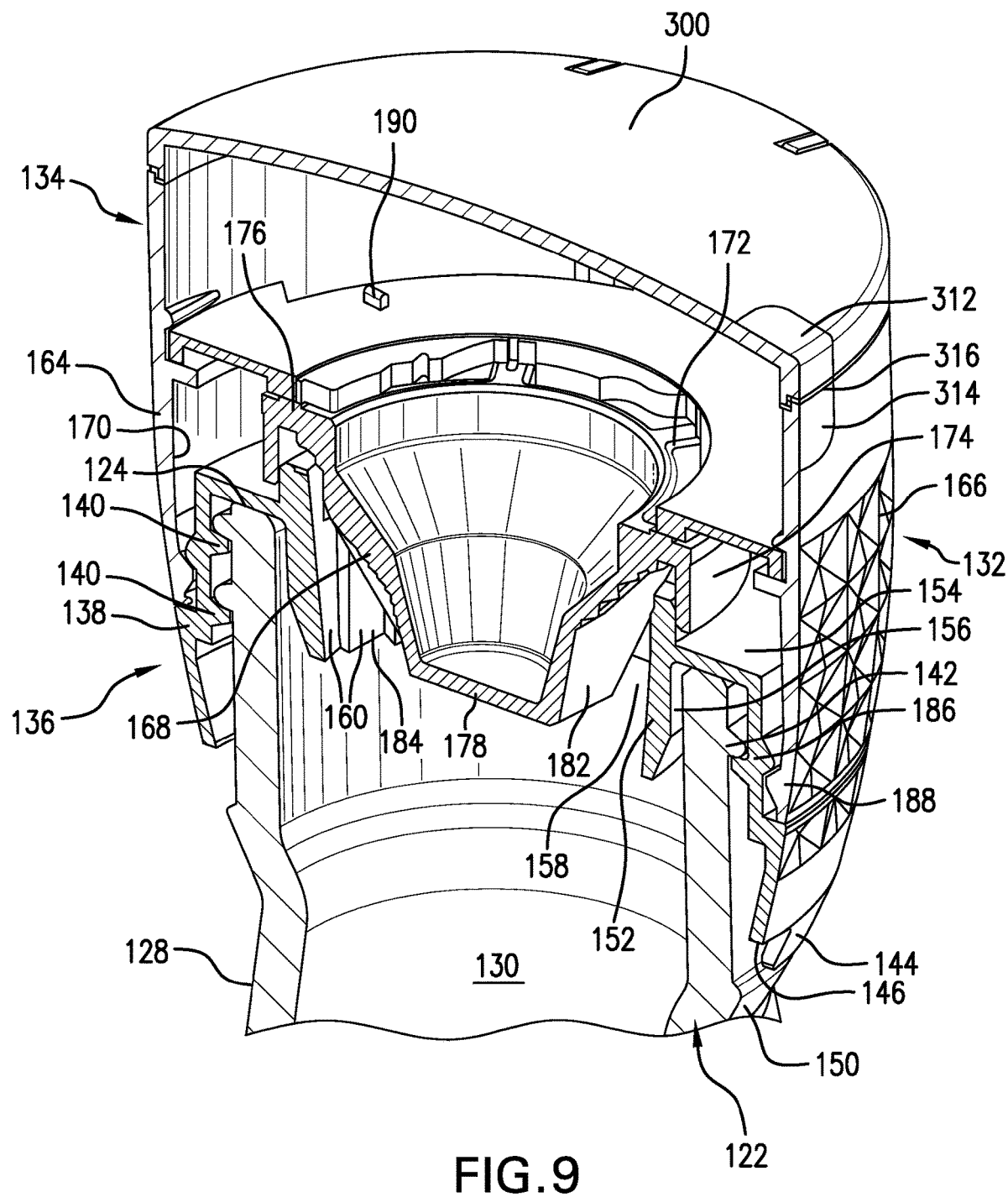
FIG. 9 is a perspective cross-sectional view of a portion of the spice dispenser of FIG. 6 according to an embodiment.
Figure 10:
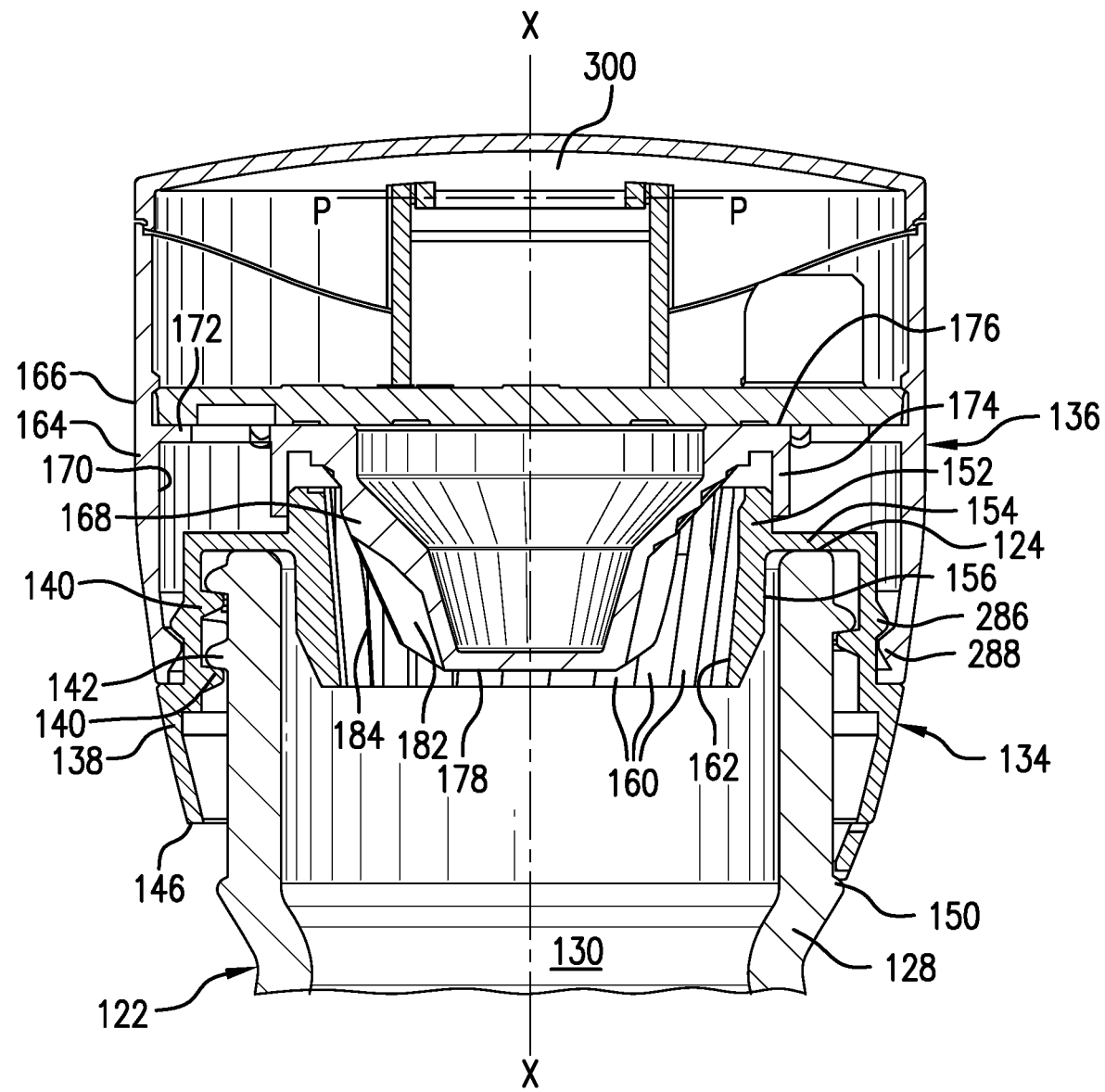
FIG. 10 is a cross-sectional view of a portion of the grinder assembly of FIG. 6 according to an embodiment.
Figure 11:
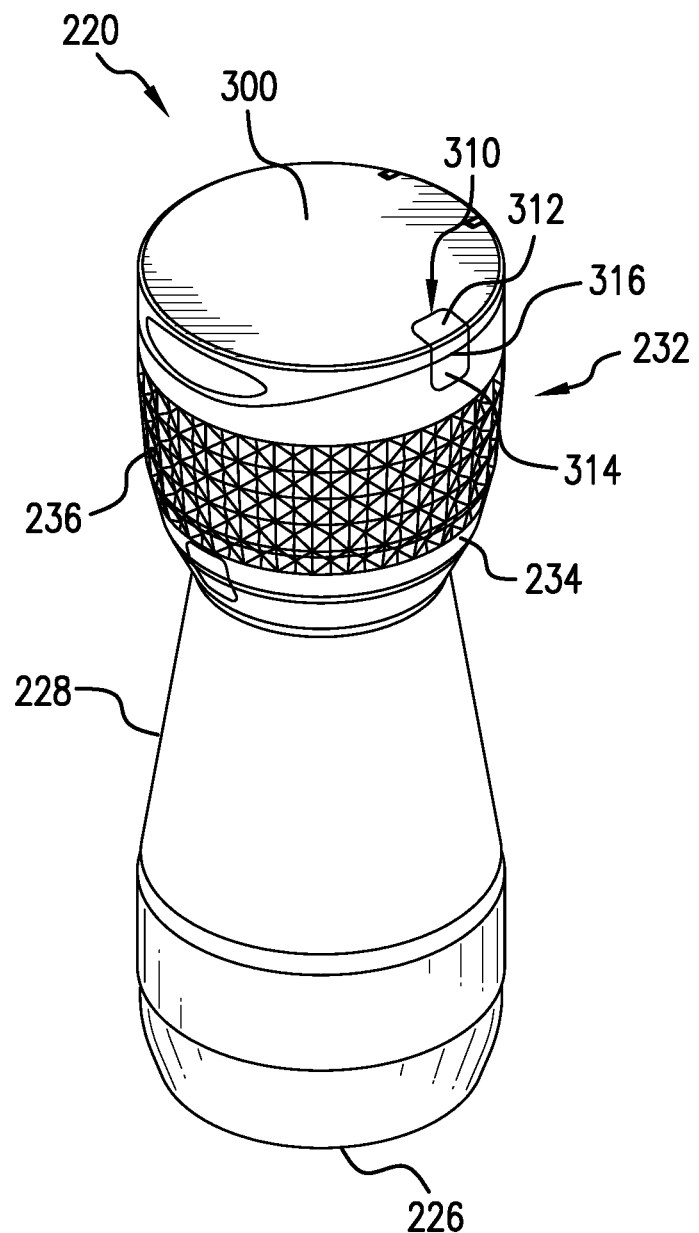
FIG. 11 is a perspective view of an example of a spice dispenser according to an embodiment.
Figure 12:
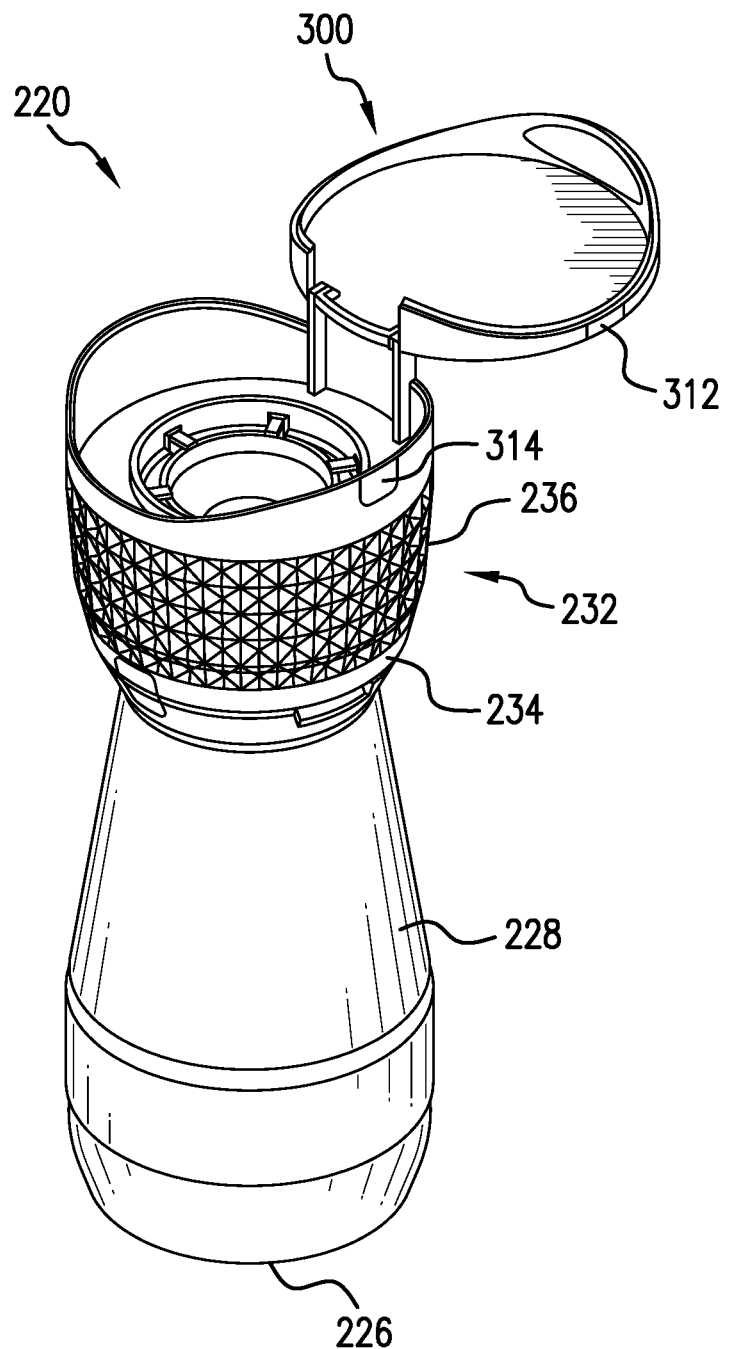
FIG. 12 is a perspective view of the spice dispenser of FIG. 11 with the lid in an open position according to an embodiment.
Figure 13:
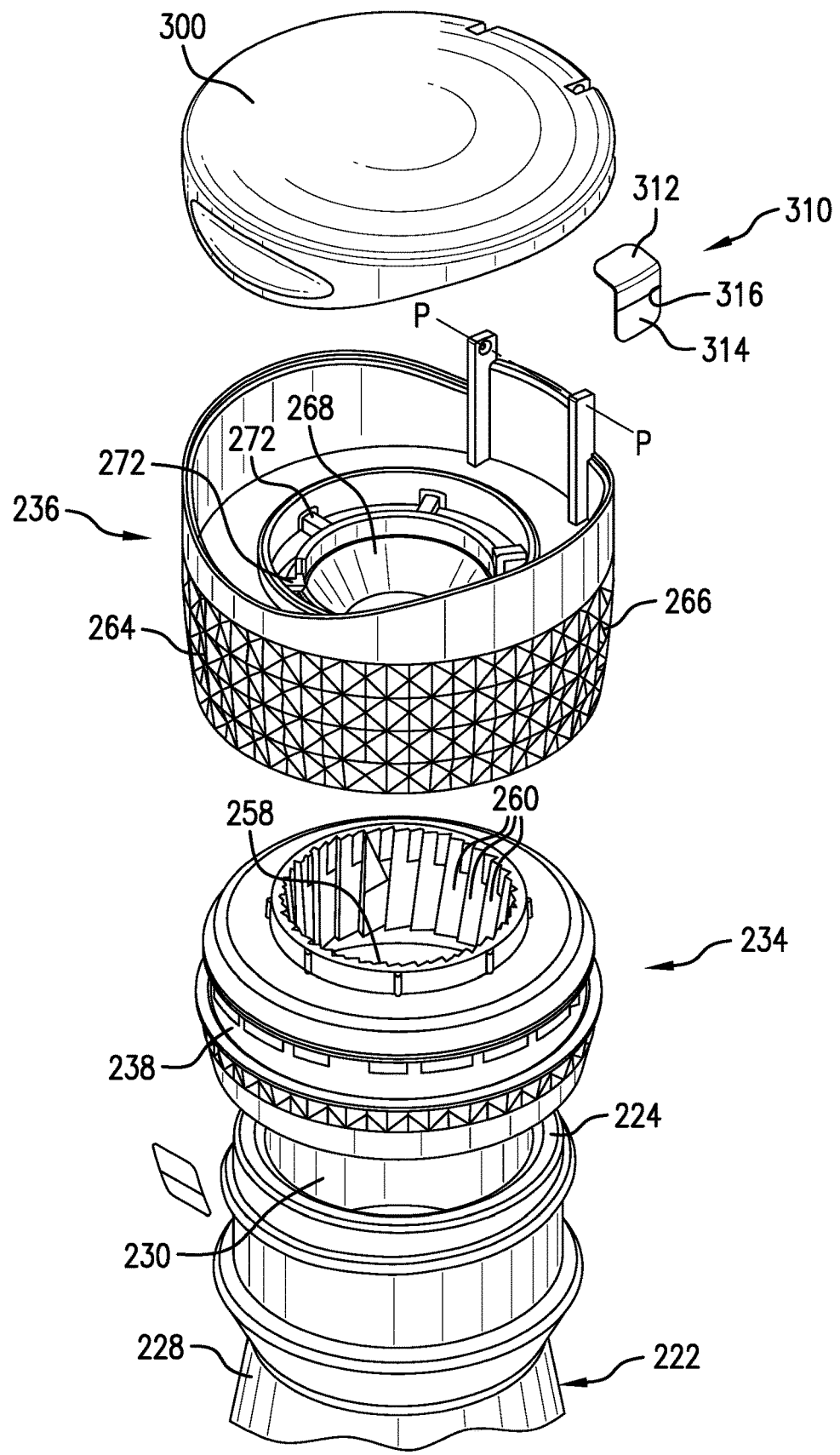
FIG. 13 is an exploded perspective view of the grinder assembly of the spice dispenser of FIG. 11 according to an embodiment.

As best shown in FIG. 4, in an embodiment, the outer housing 34 has a central bore 68 equal in diameter to the exterior of the container 22 receivable therein. As shown, the outer housing 34 surrounds the circumference of the flange 42 of the stationary grinder component 36, but does not contact the stationary grinder component 36 when the outer housing 34 is connected to the container 22. The rotatable grinder component 38 is coupled to the outer housing 34. In the illustrated, non-limiting embodiment, a groove 70 formed in an interior surface of the outer housing 34 may be sized and/or positioned to receive one or more protrusions 72 extending outwardly from a portion of the support ring 52 of the rotatable grinder component 38. However, other connections formed between the outer housing 34 and the rotatable grinder component 38 are also contemplated herein.

Further, the stationary grinder component 36 may be retained within the outer housing 34 when the outer housing 34 is not connected to a container 22. In an embodiment, the outer housing 34 includes an annular flange 74 positioned generally adjacent an underside of the flange 42 of the stationary grinder component 36. Together, the flange 42 and the rotatable grinder component 38 cooperate to retain the position of the stationary grinder component 36 relative to the rotatable grinder component 38 and the outer housing 34.

In an embodiment, the grinder assembly 32 is configured to couple to the first end 24 of the container 22 via a snap fit connection. As shown, an outwardly extending annular retaining bead 76 is located generally adjacent the first end 24 of the container 22, for example between the first end 24 of the container 22 and a shoulder 78 of the container 22. A first feature, such as a corresponding inwardly projecting tooth 80 for example, is located at an inner surface 82 of the outer housing 34. In an embodiment, the contour of at least one of the retaining bead 76 and the tooth 80 is selected to facilitate connecting the outer housing 34 to the container 22. For example, the annular retaining bead 76 has a sloped surface that causes the outer housing 34 to bow outwardly when the tooth 80 is in contact with the retaining bead 76 as the grinder assembly 32 is being attached. However, once the tooth 80 has moved axially beyond the retaining bead 76, the engagement between the retaining bead 76 and the tooth 80 restricts movement of the outer housing 34 away from the container 22, and therefore separation of the grinder assembly 32 from the container 22.

In use, the spice dispenser 20 is inverted, causing one or more spices within the container 22, such as peppercorns for example, to fall into the grinding chamber 66 defined by the gap between the grinding element 54 and the grinding sleeve 40. As the rotatable grinder component 38 is rotated relative to the stationary grinder component 36 and the container 22, the teeth 48 of the grinding sleeve 40, and in some embodiments, the teeth 62 of the grinding element 54 break the peppercorns between them. The fragments then drop out of the grinder assembly 32 through the openings between the adjacent spokes 56.

In an embodiment, the rotatable grinder component 38 is movable between a plurality of positions to vary the size of the grinding chamber 66 formed between the grinding sleeve 40 and the grinding element 54. As a result, the coarseness of the grind of the spices within the grinding chamber 66 is similarly adjusted. In the illustrated, non-limiting embodiment, a position of the grinding element 54 is controlled by an adjustment mechanism 84, such as an adjustment ring located upwardly adjacent the grinding element 54. The adjustment ring 84 is mounted in overlapping arrangement with the end 86 of the outer housing 34 and the end 60 of the rotatable grinder component 38. In an embodiment, the adjustment ring 84 is rotatable relative to the outer housing 34 and/or the rotating grinding element 54. As the adjustment ring 84 is rotated, the grinding element 54 is raised or lowered vertically relative to the grinding sleeve 40 (along the grinding axis), such as via a cam surface arranged at the interface between the adjustment ring 84 and the rotating grinding element 54 for example. However, an adjustment mechanism 84 having any suitable configuration to transform the rotatable grinding element 54 between a plurality of positions to adjust the size of the grinding chamber 66 and therefore the coarseness of the grind formed by the grinder assembly 32 is within the scope of the disclosure.

The grinder assembly 32 of the spice dispenser 20 is separable from the container to allow a user to refill the container. In an embodiment, a second feature of the grinding assembly, separate from the feature used to couple the grinding assembly to the container is used to separate the grinding assembly from the container. For example, a threaded connection may be used to disconnect the grinder assembly 32 from the container 22. To form the threaded connection, a plurality of helical threads 88 extend outwardly from a portion of the container 22 between the retaining bead 76 and the shoulder 78. A second feature including a corresponding helical engagement thread 90 extends inwardly from the inner surface 82 of the outer housing 34. As shown, the diameter of the portion of the container 22 extending between the retaining bead 76 and the shoulder 78 is less than a diameter of the container 22 at the retaining bead 76. As a result, a clearance 92 exists between the inner surface 82 of the outer housing 34 and the outer surface of the container 22. Accordingly, when the outer housing 34 is in a normal condition, the thread 90 is not engaged with the corresponding threads 88 of the container 22. Because of this, a user can easily rotate the outer housing 34, and therefore the rotatable grinder component 38, about the axis X of the grinder assembly 32 to perform a grinding operation without separating the grinder assembly 32 from the container 22.

To access the cavity 30 of the container 22 by removing the grinder assembly 32, a user must apply a radial inward force to a lower portion of the outer housing 34, causing the at least one thread 90 of the outer housing 34 to engage the adjacent threads 88 of the container 22. While these threads are in contact, the user must simultaneously rotate the outer housing 34 about the grinding axis X relative to the container 22. The helical configuration of the threads 88, will cause the outer housing 34 to move vertically while rotating. The force resulting from mechanical advantage provided by the engagement of the threads 88, 90 causes the outer housing 34 to bow, thereby allowing the tooth 80 to disengage from and overcome the retaining bead 76.

With reference now to FIGS. 6-10, another example of a spice dispenser 120 is illustrated according to an embodiment. As shown, the grinding assembly 132 has a reduced number of components compared to the embodiments of FIGS. 1-5. In the illustrated non-limiting embodiment, the spice dispenser 120 similarly includes a container 122 having a first open end 124, a second closed end 126, and at least one wall 128 extending between the first and second ends 124, 126 to define a cavity 130 for storing one or more food items.

The grinder assembly 132 mountable to the open end 124 of the container 122 includes a stationary grinder component 134 and a rotating grinder component 136. In the illustrated, non-limiting embodiment, the stationary grinder component 134 is configured to couple directly to the open end 24 of the container 22. As shown, the stationary grinder component 134 includes an annular body 138 having an inner diameter greater than the outer diameter of the first end 124 of the container 122. In an embodiment, the stationary grinder component 134 includes a plurality of inwardly extending threads 140 and the container 122 includes a plurality of outwardly extending threads 142. The inwardly and outwardly extending threads 140, 142 can cooperate to threadably couple the stationary grinder component 134 to the first end 124 of the container 122.

In an embodiment, at least one locking tab 144 extends from a lower end 146 of the stationary grinder component 134. When the stationary grinder component 134 is coupled to the first end 124 of the container 122, the at least one locking tab 144 is received within a cutout or groove 148 formed in the exterior surface of the container 122, near the shoulder 150 of the container 122 for example. Accordingly, once the stationary grinder component 134 is connected to the first end 124 of the container 122, the rotational force that would normally be applied during operation of the grinder assembly 132 is insufficient to decouple the stationary grinder component 134 from the container 122 due to the engagement between the at least one locking tab 144 and the walls of the cutout 148. In an embodiment, a user must apply a rotational force sufficient to cause the at least one locking tab 144 to flex and slide over the walls of the cutout 148, along the exterior of the container 122, to selectively decouple the stationary grinder component 134 from the container 122.

In other embodiments, where the locking tab cannot be rotated out of the cutout 148 via additional rotational force, a user may apply a radial inward force to a portion of the stationary grinder component offset form the at least one tab, such as between tabs for example. The radial force will cause the lower portion of the stationary grinder component, including the locking tabs 144 to flex out of the cutout 148. Accordingly, the stationary grinder component 134 may be freely rotated while the radial inward force in applied to decouple the stationary grinder component 134 from the container 122.

The stationary grinder component 134 additionally includes a grinding sleeve 152 having a circumferential web 154 protruding outwardly from the exterior 156 of the grinding sleeve 152 for connecting the grinding sleeve 152 to the annular body 138. As previously described, the outer diameter of the grinding sleeve 152 is generally equal to or slightly smaller than the inner diameter of the container 122 at the first open end 124 such that at least a portion of the grinding sleeve 152 extends into the cavity 130 of the container 122 when the stationary grinder component 134 is coupled to the container 122. However, it should be understood that embodiments where the grinding sleeve 152 is outside of but in communication with the cavity are also within the scope of the disclosure. In an embodiment, the web or flange 154 of the stationary grinder component 134 is arranged in direct contact with and supported by the exposed end 124 of the container 122 to properly position the stationary grinder component 134 relative to the container 122.

As shown, the grinding sleeve 152 includes a bore 158 and a plurality of teeth 160 protrude inwardly from the inner surface 162 of the grinding sleeve 152. In an embodiment, each tooth 160 is in the form of a rib which extends generally over the axial height of the grinding sleeve 152. Although the bore 158 is illustrated as being generally tapered or conical in shape, it should be understood that any suitable configuration of the stationary grinder component 134, and more specifically of the bore 158 and teeth 160 for example, are within the scope of the disclosure.

The rotatable grinder component 136 is configured to cooperate with the stationary grinder component 134 to break or grind the food arranged within the container 122. In the illustrated, non-limiting embodiment, the outer housing 34 and the rotatable grinder component 38 of the previous embodiment of FIGS. 1-5, have been combined into a single component. As shown, the rotatable grinder component 136 includes a generally hollow cylindrical outer body 164. In an embodiment, an exterior surface 166 of the outer body 164 is textured, for example knurled, to provide a surface that is easier to grasp and manipulate. A grinding element 168 is connected to the interior surface 170 of the outer body 164 by one or more radially extending spokes 172. In an embodiment, a vertical flange 174 extending from a first end 176 of the grinding element 168 is configured to abut an outer diameter of the grinding sleeve 152 of the stationary grinder component 134. The vertical flange 174 may maintain general alignment between the grinding element 168 and the grinding sleeve 152 as the grinding element 168 is moved between multiple positions, to be described in more detail below.

As previously described, in an embodiment, the rotatable grinding element 168 is generally conical is shape and is closed at its lower end 178 and open at its upper end 176. When the grinding assembly 132 is affixed to the container 122, the rotatable grinder component 136 is axially aligned with and located upwardly adjacent the stationary grinder component 134 such that at least a portion of the grinding element 168 is received within the bore 158 of the stationary grinder component 134. In an embodiment, one or more grinding teeth (not shown) are located at the exterior surface 182 of the grinding element 168.

A grinding chamber 184 is defined between the exterior 182 of the grinding element 168 and the plurality of teeth 160 of the stationary grinder component 134. This grinding chamber 184 is in communication with the openings defined between the plurality of spokes 172 coupling the grinding element 168 and the outer body 164 to define a path for the broken or ground food out of the grinding chamber 184.

In an embodiment, the rotating grinder component 136 is rotatably coupled to the stationary grinder component 134. As shown, a retaining bead 186 extends outwardly from an exterior surface of the annular body 138 of the stationary grinder component 134. A corresponding tooth 188 extending from the interior surface 170 of the body 164 of the rotating grinder component 136 is configured to cooperate with the retaining bead 186 to restrict vertical movement of the rotating grinder component 136 relative to the stationary grinder component 134. Although a snap fit interface is illustrated and described herein, it should be understood that any mechanism for rotatably connecting the rotating grinder component 136 to the stationary grinder component 134 is contemplated herein.

Similar to the embodiment of FIGS. 1-5, the rotating grinder element 168 may, but need not be, movable between a plurality of positions to vary the size of the grinding chamber 184 formed between the grinding sleeve 152 and the grinding element 168, and therefore the coarseness of the grinds formed therein. In the illustrated, non-limiting embodiment, an adjustment ring 190 is located upwardly adjacent the grinding element 168 and the one or more spokes 172 connecting the grinding element 168 to the outer body 164. The adjustment ring 190 is rotatable relative to the rotating grinder component 136 about axis grinding axis X. As the adjustment ring 190 is rotated, the grinding element 168 is raised or lowered vertically relative to the grinding sleeve 152, such as via a cam surface arranged at the interface between the adjustment ring 190 and the rotating grinding element 168. However, any mechanism for adjusting the configuration of the grinding chamber 184 is within the scope of the disclosure.

With reference now to FIGS. 11-14, another embodiment of a spice dispenser 220 is illustrated, wherein like numbers previously used in FIGS. 6-10 to describe various components are used to designate like components. The container 222, stationary grinder component 234, and rotating grinder component 236 are substantially similar to those described with respect to FIGS. 6-10. However, the spice dispenser 220 of the illustrated, non-limiting embodiment, does not include a separate adjustment ring for adjusting the vertical position of the grinding element 268 relative to the grinding sleeve 262. Rather, the functionality of the adjustment ring is integrated directly into the rotating grinder component 236.

Figure 14:
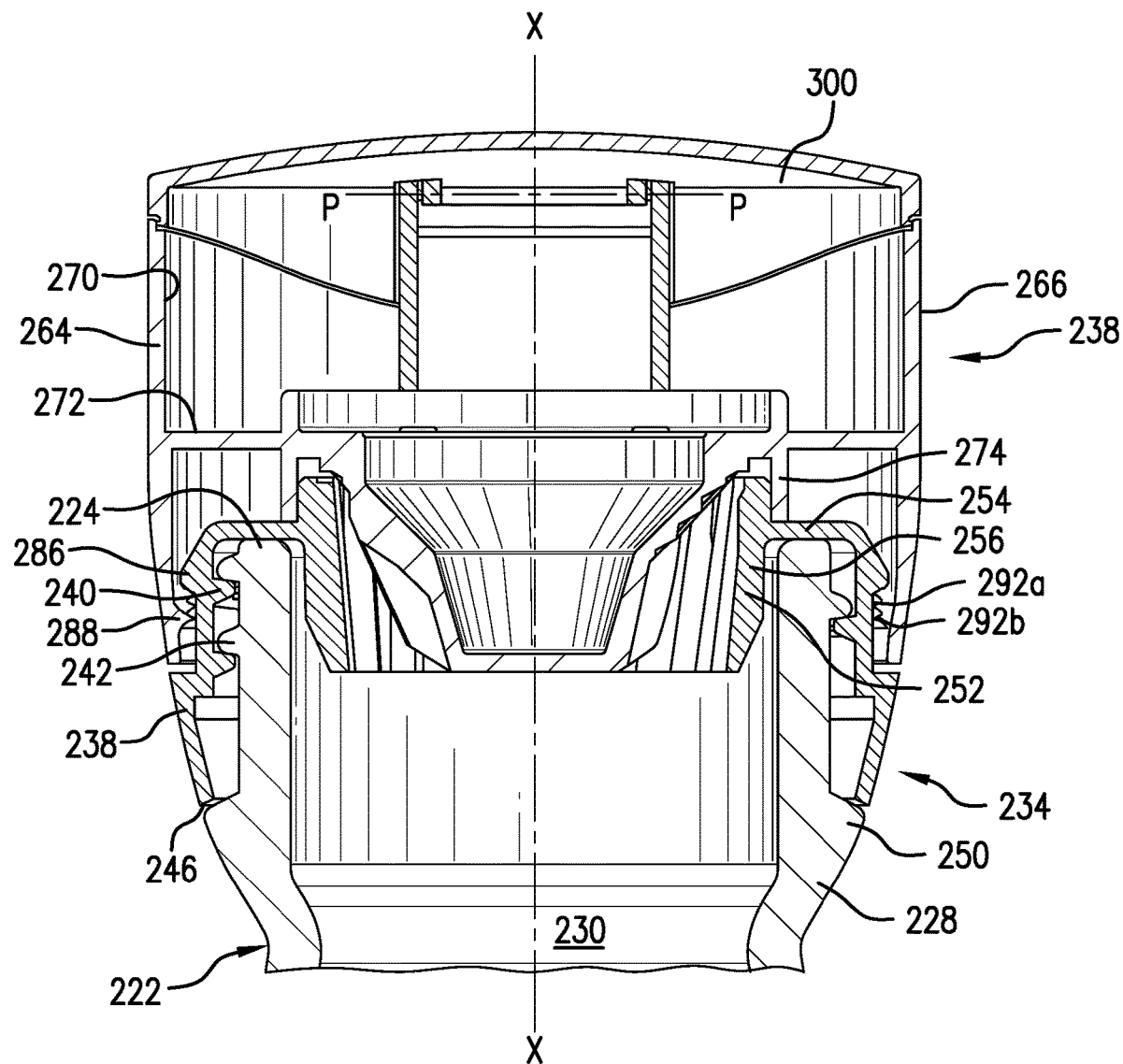
FIG. 14 is a cross-sectional view of a portion of the grinder assembly of FIG. 11 according to an embodiment.
Figure 15:
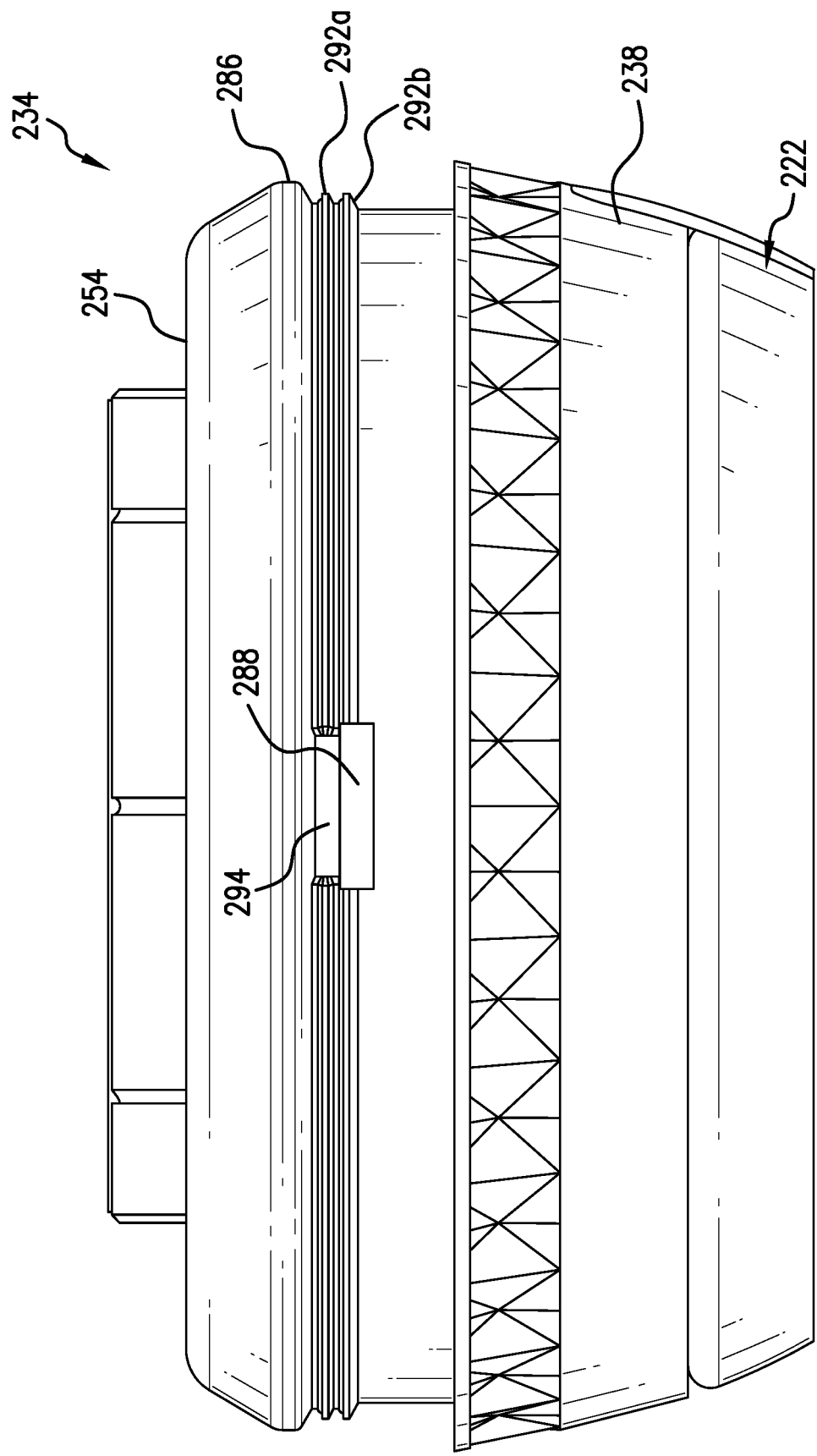
FIG. 15 is a front view of a stationary grinder component of the grinder assembly of FIG. 11 according to an embodiment.

As best shown in FIGS. 14 and 15, one or more ridges or protrusions 292 extend about an outer periphery of the annular body 238. As shown, the protrusions 292 are vertically stacked beneath the retaining bead 286, and have a smaller diameter than the retaining bead 286. In an embodiment, the protrusions do not extend continuously about the entire periphery of the annular body 238. Rather, one or more openings are formed therein. In the illustrated, non-limiting embodiment, each annular protrusion includes two openings. Further, it should be understood that the protrusions 292 are generally aligned such that the openings of the plurality of protrusions 292 are stacked relative to one another to define a path of movement.

As previously described, a tooth 288 extending from the interior surface 270 of the body 264 of the rotating grinder component 236 is configured to cooperate with the retaining bead 286 to restrict vertical movement of the rotating grinder component 236 relative to the stationary grinder component 234. Further, the tooth 288 is configured to cooperate with the one or more protrusions 292 to define various positions of the rotatable grinder element 268 relative to the grinder sleeve 252. As best shown in FIG. 15, the tooth has a radial length equal to or slightly greater than the openings formed in the protrusions.

A user can to easily manipulate the position of the tooth 288 relative to the protrusions 292, to adjust the coarseness of the grind to be produced. In an embodiment, a user rotates the rotatable grinder component 236 relative to the stationary grinder component 234 until the tooth 288 is aligned with the openings 294 formed in the plurality of protrusions 292. An indicator visible at an exterior of the spice dispenser 220 may indicate to a user when the tooth 288 and the openings 294 are aligned. Once aligned, a user may apply an axial force to the rotatable grinder component 234, thereby causing the tooth 288 to transition positions between adjacent protrusions 292. In an embodiment, seating of the tooth 288 between the protrusions 292, or between a protrusion 292 and the retaining bead 286 provides tactile feedback to the user to indicate that the tooth 288 has transitioned to an adjacent coarseness position. Once seated, the rotatable grinder component 236 may be rotated about the grinding axis X for normal use.

In the illustrated, non-limiting embodiment, best shown in FIG. 14, the grinder assembly 232 includes two protrusions 292a, 292b, such that the rotatable grinder element 268 is movable between three distinct positions. In a first position, the tooth 288 is located adjacent a bottom surface of the lowermost protrusion 292b, resulting in the lowermost positioning of the grinding element 268, and therefore the smallest grinding chamber 284. In a second position, the tooth 288 is located between the first protrusion 292a and the second protrusion 292b. The second position is vertically raised along the grinding axis relative to the first position, thereby increasing the grinding chamber 284 and the size of the grind to be produced. The tooth 288 is located between the uppermost protrusion 292a and the retaining bead 286 when in the third position. The third position is the uppermost position of the rotatable grinder component 236 relative to the grinding axis X. Accordingly, in the third position, the grinding chamber 284 is the largest, and the resulting coarseness of the grind produced is increased. It should be understood that the illustrated, non-limiting embodiment having two protrusions 292a, 292b and therefore three positions is intended as an example only, and a grinder assembly 232 having any number of protrusions and/or positions of the rotatable grinder component 236 is within the scope of the disclosure.

With reference now to each of the embodiments of FIGS. 1-14, a lid 300 may be removably connected to a portion of the grinder assembly 32, 132, 232. The lid 300 is movable between a first closed position and a second open position. In the closed position, the lid 300 is in sealing arrangement with the openings defined between the spokes 56, 172, 272 of the rotatable grinder component 38, 136, 236, and in some embodiment with the central bore of the adjustment ring 84, 190. In an embodiment, the lid 300 may be wholly separable from the grinder assembly 32, 132, 232. However, in other embodiments, the lid 300 may be affixed to an adjacent component, such as the adjustment ring 84, 490, or alternatively, the outer housing 34 or rotatable grinder component 136, 236 for example. In such embodiments, the lid 300 may be operable to pivot about a pivot axis defined by a hinge or pin for example. In an embodiment, the hinge is a friction hinge, such that the lid 300 remains fixed at any position along the axis of rotation P where a force was removed. For example, if the lid 300 was rotated fully open, the lid 300 will remain fully open until the lid 300 is moved therefrom by a user. Accordingly, in the fully open position, the lid 300 is located out of the path of the spices output from the grinder assembly 32, 132, 232, when the grinder assembly 32, 132, 232 is in use (i.e. inverted).

Alternatively, or in addition, the hinge may include a biasing mechanism (not shown) having a biasing force configured to bias the lid 300 to the fully open position once a portion of the lid 300 has been separated from the adjustment ring 84, 190, or from a latching mechanism retaining the lid 300 in the closed position. In such embodiments, to close the lid 300, a user must apply a force to the lid sufficient to overcome the biasing force of the biasing mechanism holding the lid in the open position.

In an embodiment, the grinder assembly 32, 132, 232, may further include one or more tamper evident features that may easily identify to a user if the spice dispenser had previously been used or opened. One example of a tamper evident features includes a tamper label 310. The tamper label 310 may be formed from any suitable material. The tamper label 310 includes a perforation 316 that defines a first portion 312 and a second portion 314 of the label 310. The tamper label 310 is intended to be affixed to any portion of the spice dispenser 20, 120, 220 having two components that move relative to one another. For example, the tamper label 310 may be located at the interface between the bottom of the outer housing 34, and the body of the container 22, at the interface between the stationary grinder component 134, 234 and the body of the container 122, 222, at the interface between the rotatable grinder component 136, 236 and the stationary grinder component 134, 234 or alternatively, at the interface between the lid 300 and outer housing 34 or the rotatable grinder component 136, 236.

When installing the tamper label 310 to the spice dispenser 20, 120, 220, the perforation 316 defining the first and second portions 312, 314 of the label 310 should be arranged within the plane of relative movement between the adjacent components. Accordingly, the relative movement between the components will cause the label 310 to tear or separate along the perforation 316, thereby indicating to the user that the spice dispenser 20, 120, 220 has been tampered with.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A grinder assembly removably connectable to a container of a spice dispenser comprising:
    an outer housing;
    a stationary grinder component; and
    a rotatable grinder component associated with said stationary grinder component to define a grinding chamber between a portion of said stationary grinder component and a portion of said rotatable grinder component, wherein said rotatable grinder component is rotatable with said outer housing relative to said stationary grinder component about a grinding axis; and
    a first feature for coupling the grinder assembly to said container; and
    a second feature movable to selectively decouple the grinder assembly from the container, said second feature includes at least one thread extending inwardly from said outer housing, said second feature being distinct from said first feature.

2. The grinder assembly of claim 1, wherein said first feature is couplable to the container via a snap fit connection.

3. The grinder assembly of claim 1, wherein said first feature includes a tooth extending inwardly from an interior surface of said grinder assembly.

4. The grinder assembly of claim 3, wherein said tooth is configured to cooperate with an annular retaining bead of said spice dispenser to restrict separation of said grinder assembly from said container.

5. The grinder assembly of claim 1, wherein said at least one thread is configured to cooperate with a thread of the container to separate the grinder assembly from said container.

6. The grinder assembly of claim 5, wherein said at least one thread is movable horizontally into engagement with said thread of the container.

7. The grinder assembly of claim 5, wherein rotational engagement between said at least one thread and said thread of the container is configured to decouple said first feature from said container.

8. The grinder assembly of claim 7, wherein said outer housing is flexible in response to rotational engagement of said inwardly extending thread and said at least one outwardly extending thread.

9. A reusable spice dispenser comprising:
    a container having a hollow cavity;
    a grinder assembly removably connectable to said container, said grinder assembly further comprising:
        an outer housing;
        a stationary grinder component in communication with said hollow cavity;
        a rotatable grinder component rotatable with said outer housing relative to said stationary grinder component about a grinding axis;
        a first feature for coupling the grinder assembly to said container; and
        a second feature movable to selectively decouple the grinder assembly from the container, said second feature including at least one thread extending inwardly from said outer housing, said second feature being distinct from said first feature.

10. The grinder assembly of claim 9, wherein said first feature is couplable to the container via a snap fit connection.

11. The grinder assembly of claim 9, wherein said first feature includes a tooth extending inwardly from an interior surface of said grinder assembly.

12. The grinder assembly of claim 11, wherein said tooth is configured to cooperate with an annular retaining bead of said spice dispenser to restrict separation of said grinder assembly from said container.

13. The grinder assembly of claim 9, wherein said at least one thread is configured to cooperate with a thread of the container to separate the grinder assembly from said container.

14. The grinder assembly of claim 13, wherein said at least one thread is movable horizontally into engagement with said thread of the container.

15. The grinder assembly of claim 13, wherein rotational engagement between said at least one thread and said thread of the container is configured to decouple said first feature from said container.

16. A grinder assembly removably connectable to a container of a spice dispenser comprising:
    an outer housing;
    a stationary grinder component; and
    a rotatable grinder component associated with said stationary grinder component to define a grinding chamber between a portion of said stationary grinder component and a portion of said rotatable grinder component, wherein said rotatable grinder component is rotatable relative to said stationary grinder component about a grinding axis; and
    a first feature for coupling the grinder assembly to said container; and
    a second feature operable to selectively decouple the grinder assembly from the container, said second feature being distinct from said first feature, said second feature being movable between a normal position and an engaged position, wherein said second feature is not engaged with said container in said normal position and the grinder assembly is separable from the container when said second feature is in said engaged position;
    wherein both said first feature and said second feature are arranged at an interior surface of said outer housing.

* * * * *